(12) United States Patent
Aho et al.

(10) Patent No.: US 9,069,663 B2
(45) Date of Patent: Jun. 30, 2015

(54) ALLOCATING MEMORY BASED ON PERFORMANCE RANKING

(71) Applicant: Memory Technologies LLC, Las Vegas, NV (US)

(72) Inventors: Eero T. Aho, Tampere (FI); Kimmo K. Kuusilinna, Tampere (FI); Jari A. Nikara, Lempaala (FI)

(73) Assignee: Memory Technologies LLC, Las Vegas, NV (US)

( * ) Notice: Subject to any disclaimer, the term of this patent is extended or adjusted under 35 U.S.C. 154(b) by 0 days.

(21) Appl. No.: 14/339,310

(22) Filed: Jul. 23, 2014

(65) Prior Publication Data

US 2014/0337599 A1 Nov. 13, 2014

Related U.S. Application Data

(63) Continuation of application No. 13/296,367, filed on Nov. 15, 2011, now Pat. No. 8,819,379.

(51) Int. Cl.
| | |
|---|---|
| *G06F 3/06* | (2006.01) |
| *G06F 12/02* | (2006.01) |
| *G06F 12/06* | (2006.01) |
| *G06F 13/00* | (2006.01) |
| *G06F 13/40* | (2006.01) |

(52) U.S. Cl.
CPC ............ *G06F 12/0284* (2013.01); *G06F 12/02* (2013.01); *G06F 12/0607* (2013.01); *G06F 13/00* (2013.01); *G06F 2212/1016* (2013.01); *G06F 13/4004* (2013.01)

(58) Field of Classification Search
USPC .............................. 711/5, 104, 170
See application file for complete search history.

(56) References Cited

U.S. PATENT DOCUMENTS

| | | | |
|---|---|---|---|
| 5,974,576 | A | 10/1999 | Zhu |
| 6,052,134 | A | 4/2000 | Foster |
| 6,535,966 | B1 | 3/2003 | Cherabuddi et al. |
| 7,872,657 | B1 | 1/2011 | Edmondson et al. |
| 8,285,961 | B2 | 10/2012 | Sikdar et al. |
| 2004/0088472 | A1 | 5/2004 | Nystuen et al. |
| 2008/0016308 | A1 | 1/2008 | Bartley et al. |
| 2009/0031314 | A1 | 1/2009 | Moscibroda et al. |

(Continued)

FOREIGN PATENT DOCUMENTS

| | | |
|---|---|---|
| EP | 1622391 | 2/2006 |
| GB | 2466264 | 6/2010 |
| WO | WO2006017135 | 2/2006 |

OTHER PUBLICATIONS

Diaz Nava, et al., "An Open Platform for Developing Multiprocessor SoCs", IEEE Computer, vol. 38, No. 7, Jul. 2005, pp. 60-67.
Final Office Action for U.S. Appl. No. 13/296,367, mailed on Oct. 21, 2013, Eero T. Aho, "Allocating Memory Based on Performance Ranking", 10 pages.

(Continued)

*Primary Examiner* — Gurtej Bansal
(74) *Attorney, Agent, or Firm* — Lee & Hayes, PLLC

(57) ABSTRACT

A method for optimizing memory bandwidth using bank-based memory allocation is described. The method includes receiving a request for an allocation of memory. In response to receiving the request, memory is allocated to the request based on a performance ranking of memory banks in a plurality of memory banks. A performance ranking of a particular memory bank may be based at least in part on both a busyness and a row hit ratio of the particular memory bank. Apparatus and computer readable media are also described.

32 Claims, 3 Drawing Sheets

(56) References Cited

U.S. PATENT DOCUMENTS

2009/0217273 A1  8/2009  Mutlu et al.
2010/0241782 A1  9/2010  Maddali et al.
2011/0238941 A1  9/2011  Xu et al.
2011/0258353 A1  10/2011  Wang

OTHER PUBLICATIONS

Lee, et al., "DRAM-Aware Last-Level Cache Replacement", High Performance Systems Group, Dept. of Electrical & Computer Engineering, The University of Texas at Austin, TR-HPS-2010-007, Dec. 2010, 25 pages.

Office action for U.S. Appl. No. 13/296,367, mailed on Apr. 30, 2013, Aho et al., "Allocating Memory Based on Performance Ranking", 36 pages.

ALLOCATING MEMORY BASED ON PERFORMANCE RANKING

CROSS REFERENCE TO RELATED APPLICATION

This application is a continuation of co-pending, commonly owned U.S. patent application Ser. No. 13/296,367, filed Nov. 15, 2011, entitled "ALLOCATING MEMORY BASED ON PERFORMANCE RANKING", the entirety of which is herein incorporated by reference.

TECHNICAL FIELD

The exemplary and non-limiting embodiments of this invention relate generally to memory allocation systems, methods, devices and computer programs and, more specifically, relate to memory bank based allocations to optimize bandwidth.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

A problem facing memory devices, for example, DRAM, is that the operational bandwidth may be more influenced by its configuration rather than just the peak bandwidth. The peak bandwidth rapidly increases between DRAM generations. For example, the LPDDR2 x32 200 MHz generation had a peak bandwidth of approximately 1600 MB/s, while the later LPDDR2 x32 400 MHz generation had a peak bandwidth of approximately 3200 MB/s.

With a bad bank allocation, the performance of a memory device can be very poor. When every access operation hits a different row in the same bank, a bad row hit ratio is experienced. For example, with LPDDR3 x32 800 MHz, this situation may give only 6% of the peak bandwidth. Typically, the memory bandwidth is expected to be 70% of the peak bandwidth. Thus, much less performance than expected is attained with bad memory space allocation.

Such problems may occur when using an open page policy such as commonly used in mobile systems. An open page policy leaves a page (e.g., a DRAM row) open after an access operation so that future accesses to the same page do not need to wait for the row to get re-opened. As a corollary, adding faster memories (and/or newer memories) does not improve the performance for such bank accesses. That is, newer and higher rated memories provide relatively less benefit.

Typically, the main memory is reserved by an operating system (OS). With current operating systems, the memory is reserved mainly from subsequent locations in order to keep the allocated memory space continuous. This has the effect that the memory bank usage balancing (and thus memory performance) depends mainly on the address mapping used. Some commonly used mappings are Bank-Row-Column (BRC) and Row-Bank-Column (RBC).

Contemporary memory systems may try to solve the problems encountered with bad allocations by usage of cache memories. More data than wanted is accessed from the main memory to a cache memory. It is hoped, that that excess data is needed in future accesses. However, if that data is not needed, it only consumes extra power, takes DRAM processing time and consumes cache memory (with the useless data in the cache).

Another way used to try to solve these problems is to increase the total amount of banks. Today, DRAM's may have 2, 4 or 8 banks per die, but other devices, like ones based on recent DRAM standards or Rambus XDR DRAM, may have 16 or 32 banks. In multi-channel memories, the total number of banks may be increased, but the number of banks per channel stays the same or even decreases. However, as mentioned above, increasing the number of banks does not improve the worst case scenarios.

Other techniques to solve the problem include trying to detect abnormal memory functionality in order to correct the memory operation before a system crash; however, a bad memory allocation is not considered an abnormal memory functionality.

A DRAM memory controller may be introduced which includes a page-tracking buffer (PTB). The PTB keeps track of open pages in the memory system. Unfortunately, this open page does not address the issue where bad memory allocation causes unacceptable performance.

Data elements may be interleaved across different banks Those data element can then be accessed in parallel from several banks. SRAM memory may allow parallel accesses. However, this does not improve DRAM memory bandwidth.

What is needed is a way to optimize memory bank bandwidth using memory bank based allocations.

SUMMARY

The below summary section is intended to be merely exemplary and non-limiting.

The foregoing and other problems are overcome, and other advantages are realized, by the use of the exemplary embodiments of this invention.

In a first aspect thereof an exemplary embodiment of this invention provides a method for optimizing memory bandwidth using bank-based memory allocation. The method includes receiving a request for an allocation of memory. In response to receiving the request, memory is allocated to the request based on a performance ranking of memory banks in a plurality of memory banks. A performance ranking of a particular memory bank may be based at least in part on both a busyness and a row hit ratio of the particular memory bank.

In a further aspect thereof an exemplary embodiment of this invention provides an apparatus for optimizing memory bandwidth using bank-based memory allocation. The apparatus includes at least one processor; and at least one memory including computer program code. The at least one memory and the computer program code are configured to, with the at least one processor, cause the apparatus to perform actions. The actions include receiving a request for an allocation of memory. In response to receiving the request, memory is allocated to the request based on a performance ranking of memory banks in a plurality of memory banks.

In another aspect thereof an exemplary embodiment of this invention provides a computer readable medium for optimizing memory bandwidth using bank-based memory allocation. The computer readable medium is tangibly encoded with a computer program executable by a processor to perform actions. The actions include receiving a request for an allocation of memory. In response to receiving the request, memory is allocated to the request based on a performance ranking of memory banks in a plurality of memory banks.

In a further aspect thereof an exemplary embodiment of this invention provides an apparatus for optimizing memory bandwidth using bank-based memory allocation. The apparatus includes means for receiving a request for an allocation of memory. The apparatus also includes means for allocating memory to the request based on a performance ranking of memory banks in a plurality of memory banks in response to receiving the request.

BRIEF DESCRIPTION OF THE DRAWINGS

The foregoing and other aspects of exemplary embodiments of this invention are made more evident in the following Detailed Description, when read in conjunction with the attached Drawing Figures, wherein.

DETAILED DESCRIPTION

Various exemplary embodiments in accordance with this invention make it possible to get better memory performance from memory devices. Additionally, the shorter access times provide better energy efficiency. Therefore, more value may be received from new and expensive memory components.

Figure 2:
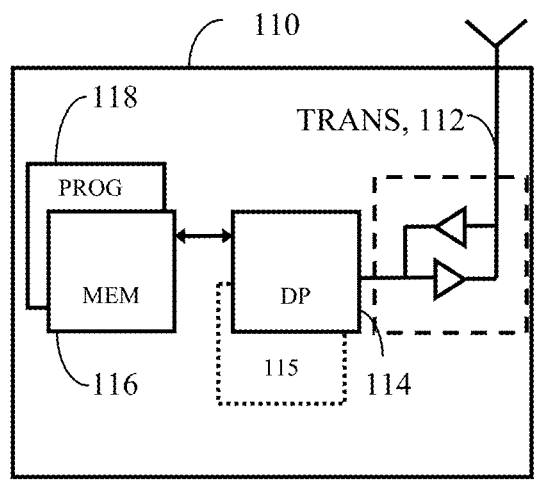
FIG. 2 shows a simplified block diagram of another exemplary electronic device that is suitable for use in practicing various exemplary embodiments of this invention.

Before describing in further detail various exemplary embodiments of this invention, reference is made to FIG. 2 for illustrating a simplified block diagram of an electronic device and apparatus that is suitable for use in practicing exemplary embodiments of this invention.

In FIG. 2, a device 110 includes a controller, such as a computer or a data processor (DP) 114 and a computer-readable memory medium embodied as a memory (MEM) 116 that stores data and a program of computer instructions (PROG) 118. The device may also include a suitable wireless interface, such as radio frequency (RF) transceiver 112, for bidirectional wireless communications with a network.

The PROG 118 is assumed to include program instructions that, when executed by the associated DP, enables the device to operate in accordance with exemplary embodiments of this invention, as will be discussed below in greater detail.

That is, various exemplary embodiments of this invention may be implemented at least in part by computer software executable by the DP 114 of the device 110, or by hardware, or by a combination of software and hardware (and firmware).

The device 110 may also include dedicated processors, for example, a memory management unit (MMU) 115.

In general, the various embodiments of the device 110 can include, but are not limited to, cellular telephones, tablets, personal digital assistants (PDAs), portable computers, image capture devices such as digital cameras, gaming devices, music storage and playback appliances, Internet appliances permitting wireless Internet access and browsing, as well as portable units or terminals that incorporate combinations of such functions.

The computer readable MEMs 116 may be of any type suitable to the local technical environment and may be implemented using any suitable data storage technology, such as DRAM memory, semiconductor based memory devices, flash memory, magnetic memory devices and systems, optical memory devices and systems, fixed memory and removable memory. The DP 114 may be of any type suitable to the local technical environment, and may include one or more of general purpose computers, special purpose computers, microprocessors, digital signal processors (DSPs) and processors based on a multicore processor architecture, as non-limiting examples. The wireless interfaces (e.g., RF transceivers 112) may be of any type suitable to the local technical environment and may be implemented using any suitable communication technology such as individual transmitters, receivers, transceivers or a combination of such components.

Various exemplary embodiments in accordance with this invention use bank-based memory allocation to optimize memory performance. This gives more flexibility to configure the memory devices and provides additional options when using memory banks.

In an exemplary embodiment in accordance with this invention, when an application asks for more memory (e.g., when reserving the memory), the reserved memory is mapped according to the current operation conditions. The system may follow (e.g., by logging) the following parameters: a row hit ratio (also called page hit ratio) in each memory bank (e.g., the relative amount of accesses that hit the same, already open, row) and a measure of the memory bank busyness (e.g., how much the memory bank is actively accessing data). Busyness may also represent the time a bank is busy reading/writing data per the total time window. The memory bank busyness may also be estimated by the average bandwidth of the memory bank (e.g., in Mbit/s) compared to the peak bandwidth of the memory bank.

Based on the history of bank busyness and row hit ratio, there can be four different types of memory bank ranks: type 1—high bank busyness and high row hit ratio; type 2—low bank busyness and high row hit ratio; type 3—high bank busyness and low row hit ratio; and type 4—low bank busyness and low row hit ratio.

The memory reservation may then be performed based on whether enough memory of the preferred type is available to satisfy the request. For example, additional memory space should be primarily reserved from type 2 first, then type 4 and type 1 and finally from type 3. Accordingly, memory is allocated primarily from banks that are not already in heavy use. This also reduces the chance that banks that are already performing poorly are used for such allocations.

In order to avoid page table size increases, the physical memory may be allocated in continuous blocks. For example, a lower ranked type of memory may be used to satisfy the request with a single block of continuous memory rather than using multiple blocks of non-continuous memory of a higher ranked type of memory.

Ranking the memory banks may be performed, for example, at regular intervals, when the device is idle, or by continuously following/logging the performance characteristics of the device. Continuous logging uses more processing time and extra energy but more can be achieved with the memory and the performance rankings are more responsive to changes in use.

Figure 3:
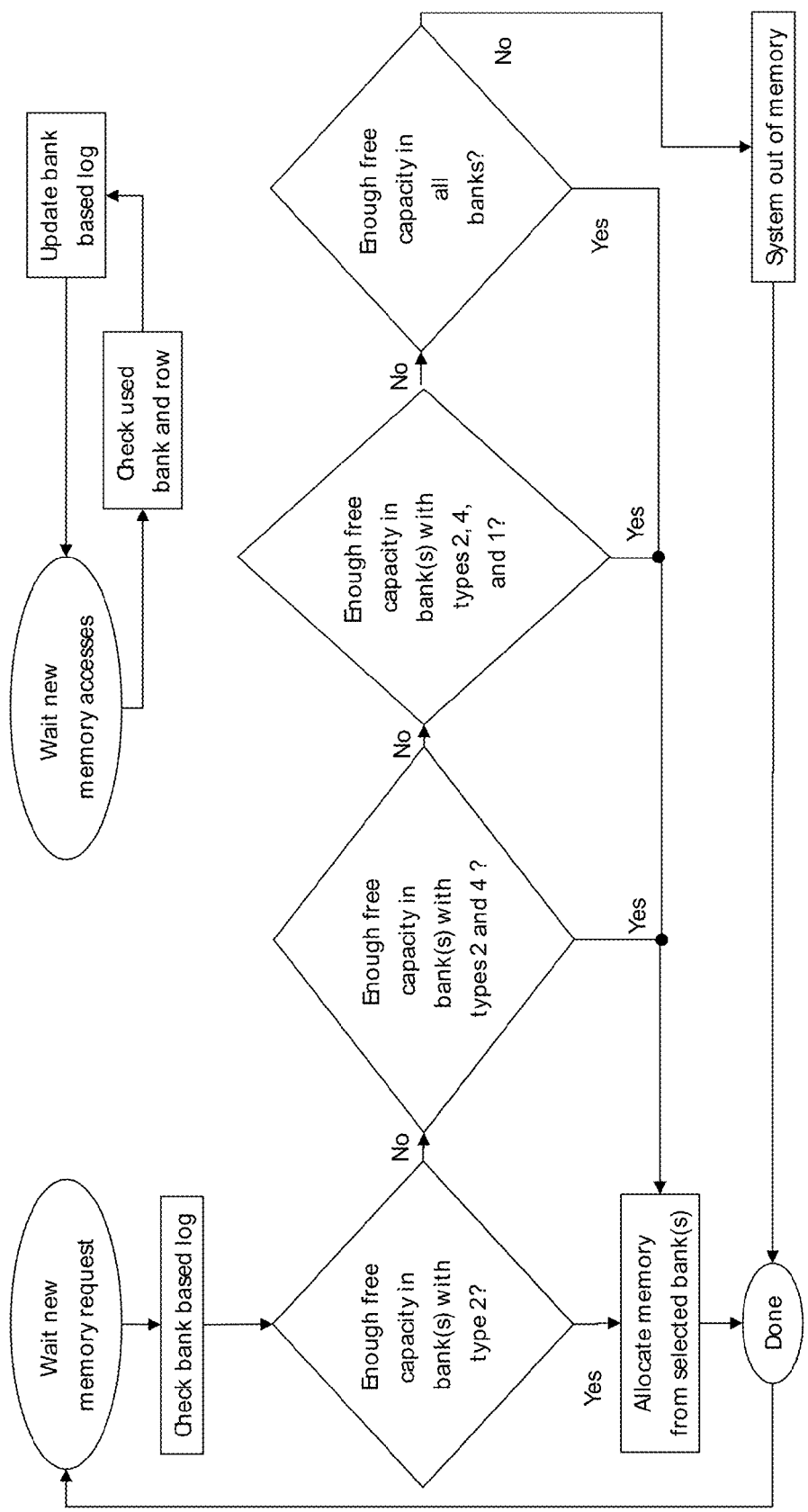
FIG. 3 is a logic flow diagram that illustrates the operation of an exemplary method, and a result of execution of computer program instructions embodied on a computer readable memory, in accordance with various exemplary embodiments of this invention.

FIG. 3 is a logic flow diagram that illustrates the operation of an exemplary method, and a result of execution of computer program instructions embodied on a computer readable memory, in accordance with various exemplary embodiments of this invention. At first, the system waits for a new memory request. After a memory request is received, bank based log information is checked. Based on that information, which banks are used to allocate the requested capacity are defined as follows:

1. If memory banks with type 2 have enough capacity, select the memory from those banks with type 2.

2. If not, but if memory banks with types 2 and 4 have enough capacity, select the memory from the combination of bank types 2 and 4.

3. If not, but if memory banks with types 2, 4, and 1 have enough capacity, select the memory from the combination of these three bank types.

4. If not, but if all memory banks have enough capacity, select the memory from any banks.

The selected memory banks are then used to allocate the requested memory capacity. If possible, the system typically attempts to allocate as continuous a memory space for the request as possible.

As depicted in FIG. 3, the bank based log is updated based on the accessed memory locations (e.g., in parallel with the above described functionality).

Figure 1:
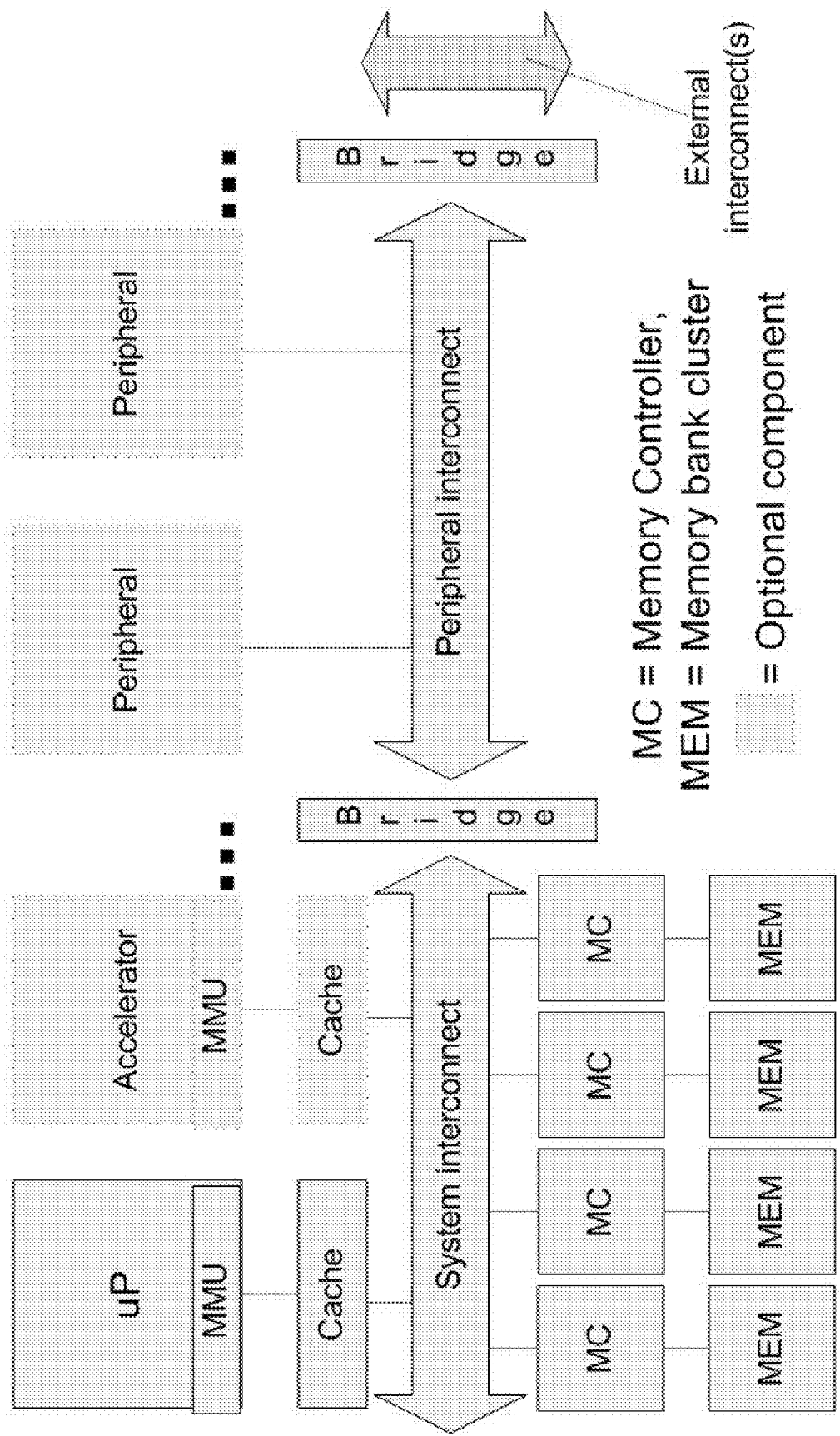
FIG. 1 shows a simplified block diagram of an exemplary electronic device that is suitable for use in practicing various exemplary embodiments of this invention.

FIG. 1 shows a simplified block diagram of an exemplary electronic device that is suitable for use in practicing various exemplary embodiments of this invention. The device includes a multichannel memory and a microprocessor (uP). Four channels are shown. However, the number of channels may be more or less than those shown.

A further exemplary embodiment of the logging information, the bank busyness and row hit ratio in each bank for each memory channel may be logged separately. Moreover, the bank busyness and row hit ratio in each bank for each page/row may be logged separately. Furthermore, memory sections(s) that a single program/process/unit is using is/are said to form a single memory context. The bank busyness and row hit ratio in each bank for each memory context may be logged separately. All information details may be taken account when allocating the requested memory capacity.

Another exemplary embodiment in accordance with this invention provides run-time remapping of the memory. While, the above described method allows allocating new memory portions in an efficient manner to achieve improved performance, it does not necessarily improve allocations already present in memory (e.g., in response to changes in memory use). In order to provide improved performance of existing memory allocations, run-time remapping of the memory may be performed.

Run-time memory operations may be monitored and remapping memory space is performed as desired (e.g., during idle periods, at regular intervals, etc.). As above, the monitored parameters include row hit ratio and busyness of all the banks For each of the bank, the following are performed:

1. If the bank has a high bank busyness and a high row hit ratio (type 1), it is in a good situation and nothing has to be done. Furthermore, additional memory reservations may be avoided since the performance may worsen if the row hit ratio decreases.

2. If the bank has a low bank busyness and a high row hit ratio (type 2), it is also in a good situation and nothing has to be done.

3. If the bank has a high bank busyness and a low row hit ratio (type 3), it is not in an acceptable situation. Part of the memory space may be remapped to another bank. The remapped memory part (from the type 3 bank) may be selected based on some criteria. For example, the smallest capacity memory context may be the part that is remapped. As another example, the memory context having the worst row hit ratio may be the part that is remapped. As a further example, a page/row having the worst row hit ratio may be the part that is remapped. The selected memory part is remapped to a bank of type 2 (primarily). Secondarily, part of the memory space may be remapped to a bank of type 4. In the selection of the target bank, a memory channel may also be used as a criterion.

4. If the bank has a low bank busyness and a low row hit ratio (type 4), it is acceptable situation and nothing has to be done.

The run-time remapping may be performed as follows: firstly, a new memory area is reserved from the specified type of destination memory bank. Secondly, old data in the memory bank being remapped is stored to the new memory area. Then, the memory address space is remapped (e.g., in a memory management unit, MMU). Finally, the data in the old memory bank being remapped is erased. The erasing may not need to be a physical operation (e.g., rewriting all the memory cells), as just removing the old references may be enough to allow memory reuse.

The memory space remapping may be started based on any one of a number of triggers. The memory space may be remapped at regular intervals or when the memory experiences a period of relative idleness. Alternatively (or in addition), when a sufficient number of memory banks encounter an undesirable condition (e.g., being categorized as type 3) the memory controller may force remapping. Also, the controller may initiate remapping if the memory device, as a whole, meets/violates various thresholds, such as a minimal bandwidth threshold.

Based on the foregoing it should be apparent that the exemplary embodiments of this invention provide a method, apparatus and computer program(s) to optimize bandwidth using bank-based memory allocation.

Figure 4:
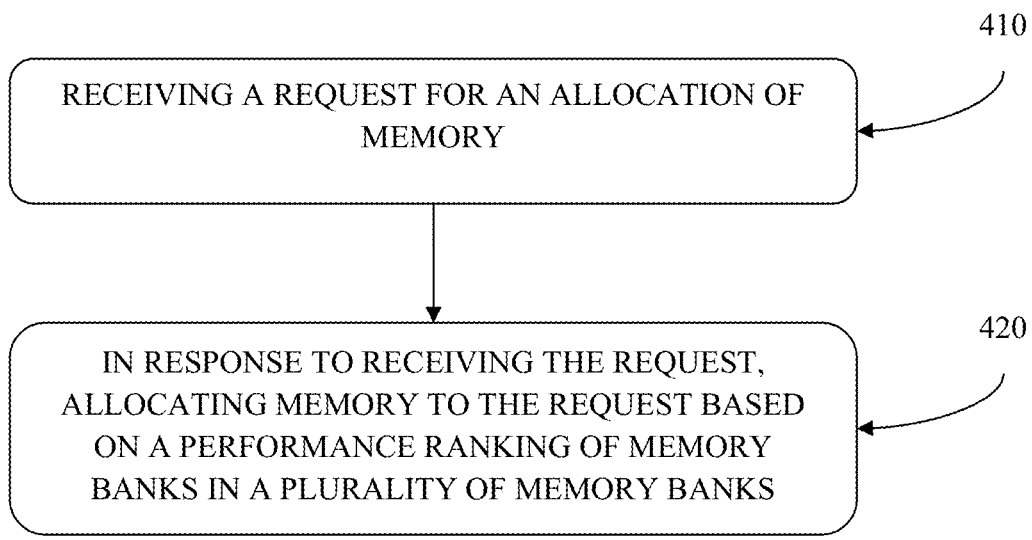
FIG. 4 is a logic flow diagram that illustrates the operation of another exemplary method, and a result of execution of computer program instructions embodied on a computer readable memory, in accordance with various exemplary embodiments of this invention.

FIG. 4 is a logic flow diagram that illustrates the operation of another exemplary method, and a result of execution of computer program instructions embodied on a computer readable memory, in accordance with various exemplary embodiments of this invention. In accordance with these exemplary embodiments a method performs, at Block 410, a step of receiving a request for an allocation of memory. At Block 420, in response to receiving the request, the method performs a step of allocating memory to the request based on a performance ranking of memory banks in a plurality of memory banks.

The various blocks shown in FIGS. 3 and 4 may be viewed as method steps, and/or as operations that result from operation of computer program code, and/or as a plurality of coupled logic circuit elements constructed to carry out the associated function(s).

An exemplary embodiment in accordance with this invention is a method for optimizing memory bandwidth using bank-based memory allocation. The method includes receiving (e.g., by a receiver) a request for an allocation of memory. In response to receiving the request, memory is allocated (e.g., by a processor) to the request based on a performance ranking of memory banks in a plurality of memory banks.

In a further exemplary embodiment of the method above, a performance ranking of a particular memory bank is based at least in part on both a busyness and a row hit ratio of the particular memory bank.

In an additional exemplary embodiment of the method above, the row hit ratio represents a relative amount of operations accessing a same, already open, row within the memory bank.

In a further exemplary embodiment of any one of the methods above, the busyness is a ratio of time the memory bank is accessed during a window of time or a ratio of average bandwidth of the memory bank per peak bandwidth of the memory bank.

In an additional exemplary embodiment of any one of the methods above, memory banks with a low busyness and a high row hit ratio are ranked for primary use. Allocating the memory includes, in response to determining that memory banks ranked for primary use are sufficiently available, allocating memory from the memory banks ranked for primary use.

In a further exemplary embodiment of the method above, memory banks with a low busyness and a low row hit ratio are ranked for secondary use when no memory banks ranked for primary use are sufficiently available.

In an additional exemplary embodiment of the method above, memory banks with a high busyness and a high row hit ratio are ranked for tertiary use when no memory banks ranked for primary use and no memory banks ranked for secondary use are sufficiently available.

In a further exemplary embodiment of the method above, memory banks with a high busyness and a low row hit ratio are ranked for use when no other ranked memory banks are sufficiently available.

In an additional exemplary embodiment of any one of the methods above, allocating the memory comprises allocating continuous memory locations from a memory bank.

In a further exemplary embodiment of any one of the methods above, the method also includes monitoring operations accessing the plurality of memory banks; and determining, based on the monitored operations, an updated busyness and an updated row hit ratio for accessed memory banks in the plurality of memory banks In an additional exemplary embodiment of the method above, the method also includes, in response to determining the updated busyness and the updated row hit ratio for a first memory bank is a high busyness and a low row hit ratio, moving at least a portion of data stored in the first memory bank to at least one of a second memory bank and a third memory bank. The second memory bank having a low busyness and a high row hit ratio and the third memory bank having a low busyness and a low row hit ratio.

A further exemplary embodiment in accordance with this invention is an apparatus for optimizing memory bandwidth using bank-based memory allocation. The apparatus includes at least one processor; and at least one memory including computer program code. The at least one memory and the computer program code are configured to, with the at least one processor, cause the apparatus to perform actions. The actions include receiving a request for an allocation of memory. In response to receiving the request, memory is allocated to the request based on a performance ranking of memory banks in a plurality of memory banks.

In an additional exemplary embodiment of the apparatus above, a performance ranking of a particular memory bank is based at least in part on both a busyness and a row hit ratio of the particular memory bank.

In a further exemplary embodiment of the apparatus above, the row hit ratio represents a relative amount of operations accessing a same, already open, row within the memory bank.

In an additional exemplary embodiment of any one of the apparatus above, the busyness is a ratio of time the memory bank is accessed during a window of time or a ratio of average bandwidth of the memory bank per peak bandwidth of the memory bank.

In a further exemplary embodiment of any one of the apparatus above, memory banks with a low busyness and a high row hit ratio are ranked for primary use. The at least one memory and the computer program code are further configured to cause the apparatus, when allocating the memory, to allocate memory from the memory banks ranked for primary use in response to determining that memory banks ranked for primary use are sufficiently available.

In an additional exemplary embodiment of the apparatus above, memory banks with a low busyness and a low row hit ratio are ranked for secondary use when no memory banks ranked for primary use are sufficiently available.

In a further exemplary embodiment of the apparatus above, memory banks with a high busyness and a high row hit ratio are ranked for tertiary use when no memory banks ranked for primary use and no memory banks ranked for secondary use are sufficiently available.

In an additional exemplary embodiment of the apparatus above, memory banks with a high busyness and a low row hit ratio are ranked for use when no other ranked memory banks are sufficiently available.

In a further exemplary embodiment of any one of the apparatus above, the at least one memory and the computer program code are further configured to cause the apparatus, when allocating the memory, to allocate continuous memory locations from a memory bank.

In an additional exemplary embodiment of any one of the apparatus above, the actions also includes monitoring operations accessing the plurality of memory banks; and determining, based on the monitored operations, an updated busyness and an updated row hit ratio for accessed memory banks in the plurality of memory banks In a further exemplary embodiment of the apparatus above, the actions also include, in response to determining the updated busyness and the updated row hit ratio for a first memory bank is a high busyness and a low row hit ratio, moving at least a portion of data stored in the first memory bank to at least one of a second memory bank and a third memory bank. The second memory bank having a low busyness and a high row hit ratio and the third memory bank having a low busyness and a low row hit ratio.

In an additional exemplary embodiment of any one of the apparatus above, the apparatus is embodied in an integrated circuit and/or a mobile device.

A further exemplary embodiment in accordance with this invention is a computer readable medium for optimizing memory bandwidth using bank-based memory allocation. The computer readable medium is tangibly encoded with a computer program executable by a processor to perform actions. The actions include receiving a request for an allocation of memory. In response to receiving the request, memory is allocated to the request based on a performance ranking of memory banks in a plurality of memory banks.

In an additional exemplary embodiment of the computer readable medium above, a performance ranking of a particular memory bank is based at least in part on both a busyness and a row hit ratio of the particular memory bank.

In a further exemplary embodiment of the computer readable medium above, the row hit ratio represents a relative amount of operations accessing a same, already open, row within the memory bank.

In an additional exemplary embodiment of any one of the computer readable media above, the busyness is a ratio of time the memory bank is accessed during a window of time or a ratio of average bandwidth of the memory bank per peak bandwidth of the memory bank.

In a further exemplary embodiment of any one of the computer readable media above, memory banks with a low busyness and a high row hit ratio are ranked for primary use. The at least one memory and the computer program code are further configured to cause the apparatus, when allocating the memory, to allocate memory from the memory banks ranked for primary use in response to determining that memory banks ranked for primary use are sufficiently available.

In an additional exemplary embodiment of the computer readable medium above, memory banks with a low busyness and a low row hit ratio are ranked for secondary use when no memory banks ranked for primary use are sufficiently available.

In a further exemplary embodiment of the computer readable medium above, memory banks with a high busyness and a high row hit ratio are ranked for tertiary use when no memory banks ranked for primary use and no memory banks ranked for secondary use are sufficiently available.

In an additional exemplary embodiment of the computer readable medium above, memory banks with a high busyness and a low row hit ratio are ranked for use when no other ranked memory banks are sufficiently available.

In a further exemplary embodiment of any one of the computer readable media above, the at least one memory and the computer program code are further configured to cause the apparatus, when allocating the memory, to allocate continuous memory locations from a memory bank.

In an additional exemplary embodiment of any one of the computer readable media above, the actions also includes monitoring operations accessing the plurality of memory banks; and determining, based on the monitored operations, an updated busyness and an updated row hit ratio for accessed memory banks in the plurality of memory banks.

In a further exemplary embodiment of the computer readable medium above, the actions also include, in response to determining the updated busyness and the updated row hit ratio for a first memory bank is a high busyness and a low row hit ratio, moving at least a portion of data stored in the first memory bank to at least one of a second memory bank and a third memory bank. The second memory bank having a low busyness and a high row hit ratio and the third memory bank having a low busyness and a low row hit ratio.

In an additional exemplary embodiment of any one of the computer readable media above, the computer readable medium is a non-transitory computer readable medium (e.g., CD-ROM, flash memory, RAM, etc.).

A further exemplary embodiment in accordance with this invention is an apparatus for optimizing memory bandwidth using bank-based memory allocation. The apparatus includes means for receiving (e.g., a receiver) a request for an allocation of memory. The apparatus also includes means for allocating (e.g., a processor) memory to the request based on a performance ranking of memory banks in a plurality of memory banks in response to receiving the request.

In an additional exemplary embodiment of the apparatus above, a performance ranking of a particular memory bank is based at least in part on both a busyness and a row hit ratio of the particular memory bank.

In a further exemplary embodiment of the apparatus above, the row hit ratio represents a relative amount of operations accessing a same, already open, row within the memory bank.

In an additional exemplary embodiment of any one of the apparatus above, the busyness is a ratio of time the memory bank is accessed during a window of time or a ratio of average bandwidth of the memory bank per peak bandwidth of the memory bank.

In a further exemplary embodiment of any one of the apparatus above, memory banks with a low busyness and a high row hit ratio are ranked for primary use. The allocating means includes, means for allocating memory from the memory banks ranked for primary use in response to determining that memory banks ranked for primary use are sufficiently available.

In an additional exemplary embodiment of the apparatus above, memory banks with a low busyness and a low row hit ratio are ranked for secondary use when no memory banks ranked for primary use are sufficiently available.

In a further exemplary embodiment of the apparatus above, memory banks with a high busyness and a high row hit ratio are ranked for tertiary use when no memory banks ranked for primary use and no memory banks ranked for secondary use are sufficiently available.

In an additional exemplary embodiment of the apparatus above, memory banks with a high busyness and a low row hit ratio are ranked for use when no other ranked memory banks are sufficiently available.

In a further exemplary embodiment of any one of the apparatus above, the allocating means includes means for allocating continuous memory locations from a memory bank.

In an additional exemplary embodiment of any one of the apparatus above, the apparatus also includes means for monitoring operations accessing the plurality of memory banks; and means for determining, based on the monitored operations, an updated busyness and an updated row hit ratio for accessed memory banks in the plurality of memory banks.

In a further exemplary embodiment of the apparatus above, the apparatus also includes, means for moving at least a portion of data stored in the first memory bank to at least one of a second memory bank and a third memory bank in response to determining the updated busyness and the updated row hit ratio for a first memory bank is a high busyness and a low row hit ratio. The second memory bank having a low busyness and a high row hit ratio and the third memory bank having a low busyness and a low row hit ratio.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of DRAM memory, it should be appreciated that the exemplary embodiments of this invention are not limited for use with only this one particular type of memory, and that they may be used to advantage in other memories such as for example flash memory and multichannel memory.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. An apparatus, comprising:
   at least one processor; and
   at least one storage including computer program code stored thereon, that, when executed by the at least one processor, causes the apparatus to:
      determine a performance metric for at least a portion of a memory bank of a memory, wherein the performance metric is based at least in part on a busyness measure of at least the portion of the memory bank and a row hit ratio measure of at least the portion of the memory bank; and
      cause data stored on at least the portion of the memory bank to be re-allocated based at least in part on the performance metric.

2. The apparatus of claim 1, wherein the portion of the memory bank comprises one of a page, a section, a block, or a plane.

3. The apparatus of claim 1, wherein the memory bank comprises part of a multi-channel memory, and wherein the busyness measure of at least the portion of the memory bank and the row hit ratio measure of at least the portion of the memory bank are associated with a first channel of a plurality of channels that couple the memory bank to a memory controller.

4. The apparatus of claim 1, wherein the computer program code, when executed by the at least one processor, further causes the apparatus to trigger re-allocation at regular intervals or during an idle state.

5. The apparatus of claim 1, wherein the memory bank comprises a first memory bank, and wherein the computer program code, when executed by the at least one processor, further causes the apparatus to:
   monitor a plurality of performance metrics associated with a plurality of memory banks of the memory, the plurality of performance metrics including the performance metric of at least the portion of the first memory bank; and
   trigger re-allocation based at least in part on a determination that a threshold number of the plurality of memory banks are associated with one or more of low row hit ratio measures and high busyness measures.

6. The apparatus of claim 1, wherein the computer program code, when executed by the at least one processor, further causes the apparatus to:
   monitor bandwidth associated with the memory; and
   trigger re-allocation based at least in part on a determination that the bandwidth associated with the memory is below a threshold bandwidth.

7. The apparatus of claim 1, wherein the performance metric comprises a first performance metric, the busyness measure comprises a first busyness measure, the row hit ratio measure comprises a first row hit ratio measure, the portion of the memory bank comprises a first portion of a first memory bank, and the computer program code, when executed by the at least one processor, further causes the apparatus to:
   determine a second performance metric for at least a second portion of a second memory bank based at least in part on a second busyness measure of at least the second portion of the second memory bank and a second row hit ratio measure of at least the second portion of the second memory bank; and
   cause the data to be re-allocated from at least the first portion of the first memory bank to at least the second portion of the second memory bank based at least in part on the second performance metric.

8. The apparatus of claim 7, wherein the first busyness measure comprises a high busyness measure, the first row hit ratio measure comprises a low row hit ratio measure, the second busyness measure comprises a low busyness measure, and the second row hit ratio measure comprises a high row hit ratio measure.

9. The apparatus of claim 1, wherein the performance metric comprises a portion-specific performance metric of the portion of the memory bank, the portion-specific performance metric based at least in part on a portion-specific row hit ratio measure of the portion of the memory bank.

10. The apparatus of claim 9, wherein the portion of the memory bank comprises one of a row of the memory bank or a page of the memory bank.

11. The apparatus of claim 9, wherein the portion of the memory bank comprises a section of the memory bank, wherein the section includes all data associated with a single process or a single program that is stored on the memory bank.

12. A method, comprising:
   determining, by a memory controller, a performance metric for at least a portion of a memory bank of a memory, wherein the performance metric is based at least in part on a busyness measure of at least the portion of the memory bank and a row hit ratio measure of at least the portion of the memory bank; and
   causing data stored on at least the portion of the memory bank to be re-allocated based at least in part on the performance metric.

13. The method of claim 12, wherein the portion of the memory bank comprises one of a page, a section, a block, or a plane.

14. The method of claim 12, wherein the memory bank comprises a first memory bank, the method further comprising:
   monitoring a plurality of performance metrics associated with a plurality of memory banks of the memory, the plurality of performance metrics including the performance metric of at least the portion of the first memory bank; and triggering re-allocation based at least in part on a determination that a threshold number of the plurality of memory banks are associated with one or more of low row hit ratio measures and high busyness measures.

15. The method of claim 12, further comprising:
monitoring bandwidth associated with the memory; and
triggering re-allocation based at least in part on a determination that the bandwidth associated with the memory is below a threshold bandwidth.

16. The method of claim 12, wherein the performance metric comprises a first performance metric, the busyness measure comprises a first busyness measure, the row hit ratio measure comprises a first row hit ratio measure, the portion of the memory bank comprises a first portion of a first memory bank, and the method further comprises:
determining a second performance metric of at least a second portion of a second memory bank based at least in part on a second busyness measure of at least the second portion of the second memory bank and a second row hit ratio measure of at least the second portion of the second memory bank; and
causing the data to be re-allocated from at least the first portion of the first memory bank to at least the second portion of the second memory bank based at least in part on the second performance metric.

17. The method of claim 16, wherein the first busyness measure comprises a high busyness measure, the first row hit ratio measure comprises a low row hit ratio measure, the second busyness measure comprises a low busyness measure, and the second row hit ratio measure comprises a high row hit ratio measure.

18. The method of claim 12, wherein the performance metric comprises a portion-specific performance metric for the portion of the memory bank, the method further comprising causing, based at least in part on the portion-specific performance metric, the data from the portion of the memory bank to be re-allocated.

19. The method of claim 18, further comprising determining the portion-specific performance metric based at least in part on a portion-specific row hit ratio measure associated with the portion of the memory bank.

20. The method of claim 18, wherein the portion of the memory bank comprises one of a row of the memory bank or a page of the memory bank.

21. The method of claim 18, wherein the portion of the memory bank comprises a section of the memory bank, wherein the section includes all data associated with a single process or a single program that is stored on the memory.

22. A memory device, comprising:
a memory; and
a memory controller configured to:
determine a performance metric for at least a portion of a memory bank of the memory, wherein the performance metric of at least the portion of the memory bank is based at least in part on a busyness measure of at least the portion of the memory bank and a row hit ratio measure of at least the portion of the memory bank; and
cause data stored on at least the portion of the memory bank to be re-allocated based at least in part on the performance metric.

23. The memory device of claim 22, wherein the portion of the memory bank comprises one of a page, a section, a block, or a plane.

24. The memory device of claim 22, wherein the memory bank comprises a first memory bank and the memory controller is further configured to:
monitor a plurality of performance metrics associated with a plurality of memory banks of the memory, the plurality of performance metrics including the performance metric of at least the portion of the first memory bank; and
trigger re-allocation based at least in part on a determination that a threshold number of the plurality of memory banks are associated with one or more of low row hit ratio measures and high busyness measures.

25. The memory device of claim 22, wherein the memory controller is further configured to:
monitor bandwidth associated with the memory; and
trigger re-allocation based at least in part on a determination that the bandwidth associated with the memory is below a threshold bandwidth.

26. The memory device of claim 22, wherein the performance metric comprises a first performance metric, the busyness measure comprises a first busyness measure, the row hit ratio measure comprises a first row hit ratio measure, the portion of the memory bank comprises a first portion of a first memory bank, and the memory controller is further configured to:
determine a second performance metric of at least a second portion of a second memory bank based at least in part on a second busyness measure of at least the second portion of the second memory bank and a second row hit ratio measure of at least the second portion of the second memory bank; and
cause the data to be re-allocated from at least the first portion of the first memory bank to at least the second portion of the second memory bank based at least in part on the second performance metric.

27. The memory device of claim 26, wherein the first busyness measure comprises a high busyness measure, the first row hit ratio measure comprises a low row hit ratio measure, the second busyness measure comprises a low busyness measure, and the second row hit ratio measure comprises a high row hit ratio measure.

28. The memory device of claim 22, wherein the performance metric comprises a portion-specific performance metric for the portion of the memory bank, and the memory controller is further configured to, based at least in part on the portion-specific performance metric, cause the data from the portion of the memory bank to be re-allocated.

29. The memory device of claim 28, wherein the memory controller is further configured to determine the portion-specific performance metric based at least in part on a portion-specific row hit ratio measure associated with the portion of the memory bank.

30. The memory device of claim 28, wherein the portion of the memory bank comprises one of a row of the memory bank or a page of the memory bank.

31. The memory device of claim 28, wherein the portion comprises a section of the memory bank, wherein the section includes all data associated with a single process or a single program that is stored on the memory.

32. An apparatus, comprising:
a memory;
means for determining a performance metric for at least a portion of a memory bank of the memory, wherein the performance metric of at least the portion of the memory bank is based at least in part on a busyness measure of at least the portion of the memory bank and a row hit ratio measure of at least the portion of the memory bank; and means for causing data stored on at least the portion of the memory bank to be re-allocated based at least in part on the performance metric.

\* \* \* \* \*